Oct. 25, 1966          H. SABET                3,280,803
            ROTARY INTERNAL COMBUSTION ENGINE
Filed Sept. 22, 1964                       3 Sheets-Sheet 1

Inventor:
HUSCHANG SABET
BY
Michael J. Striker
his ATTORNEY

Oct. 25, 1966    H. SABET    3,280,803
ROTARY INTERNAL COMBUSTION ENGINE
Filed Sept. 22, 1964    3 Sheets-Sheet 2

*Inventor:*
HUSCHANG SABET

BY
Michael J. Striker
his ATTORNEY

Oct. 25, 1966     H. SABET     3,280,803
ROTARY INTERNAL COMBUSTION ENGINE
Filed Sept. 22, 1964     3 Sheets-Sheet 3

Inventor:
HUSCHANG SABET

BY Richard J. Striker
his ATTORNEY

3,280,803
ROTARY INTERNAL COMBUSTION ENGINE
Huschang Sabet, Eduard-Pfeiffer-Strasse 67,
Stuttgart, Germany
Filed Sept. 22, 1964, Ser. No. 398,326
Claims priority, application Germany, Sept. 27, 1963,
S 87,570
15 Claims. (Cl. 123—11)

The present invention relates to internal combustion engines in general, and more particularly to rotary internal combustion engines wherein one or more pistons rotate in a fixed cylinder chamber to drive a shaft or a similar output member. Still more particularly, the invention relates to improved pistons and hubs which may be used in such types of internal combustion engines.

It is already known to provide a rotary internal combustion engine with a cylinder whose internal space is divided into four or more cylinder chamber by two or more pairs of relatively movable pistons which rotate in the cylinder. If the engine comprises two pairs of pistons, one pair of pistons is secured to a first section of the hub and the other pair of pistons is secured to a second section of the hub which latter hub section is coaxial to and is angularly movable (within limits) with reference to the first hub section so that the volume of the cylinder chambers increases or decreases whereby the engine draws air or expels combustion products in a manner well known from the art of rotary piston engines. The pistons and the hub sections are connected to each other by bolts or similar threaded fasteners. It is also known to provide the pistons with threads which mate with complementary threads on the corresponding hub sections. A serious drawback of all such engines is that the sealing action of elements which are interposed between relatively movable parts changes drastically when the pistons are heated to an elevated temperature. This is due to the fact that the pistons normally consist of lightweight metallic material whereas the hub and the cylinder consist of cast steel whose heat expansion coefficient differentiates substantially from that of the piston material. The resultant leaks, increased friction and high tensional and other stresses reduce the efficiency and useful life of such engines.

Accordingly, it is an important object of the present invention to provide an improved rotary internal combustion engine wherein the fact that the heat expansion coefficient of the cylinder and/or hub differentiates substantially from the heat expansion coefficient of a piston affects little or not at all the wear, useful life and efficiency of the engine.

Another object of the invention is to provide a novel connection between a piston and the hub in a rotary internal combustion engine of the just outlined characteristics.

A further object of the invention is to provide a novel connection between the pistons and hub sections of internal combustion engines wherein the pistons are disposed in pairs which are free to perform limited angular movements with reference to each other.

A concomitant object of the invention is to provide a piston for rotary internal combustion engines which is not likely to jam, which is constructed and mounted with a view to reduce friction with the relatively movable section or sections of the hub, and which can be removed from the cylinder without necessitating complete dismantling of the engine.

Still another object of the invention is to provide a novel hub for use in a rotary internal combustion engine of the above outlined characteristics.

Briefly stated, my rotary internal combustion engine comprises a rotary hub including a pair of coaxial sections which are movable angularly with reference to each other and have cylindrical peripheral surfaces, a piston which extends radially outwardly from and has a concave surface which is adjacent to the peripheral surfaces of the hub sections, a plate-like bearing member which is interposed between the hub sections and the piston and which is preferably recessed in the peripheral surface of one hub section and/or in the adjacent surface of the piston, and radial bolts or similar fasteners serving to secure the piston and the bearing member to the one hub section so that the bearing member rotates with the piston and is movable angularly with reference to the other hub section or sections. In accordance with an important feature of my invention, the bearing member consists of a material whose heat expansion coefficient at least approximates but preferably corresponds to the heat expansion coefficient of the material of the hub but normally differentiates considerably from the heat expansion coefficient of the material of the piston. The piston preferably consists of light metal and the hub preferably consists of ferrous material, e.g., cast steel.

The novel features which are considered as characteristic of the invention are set forth in particular in the appended claims. The improved engine itself, however, both as to its construction and the mode of assembling the same, together with additional features and advantages thereof, will be best understood upon perusal of the following detailed description of certain specific embodiments with reference to the accompanying drawings, in which:

Figure 1:
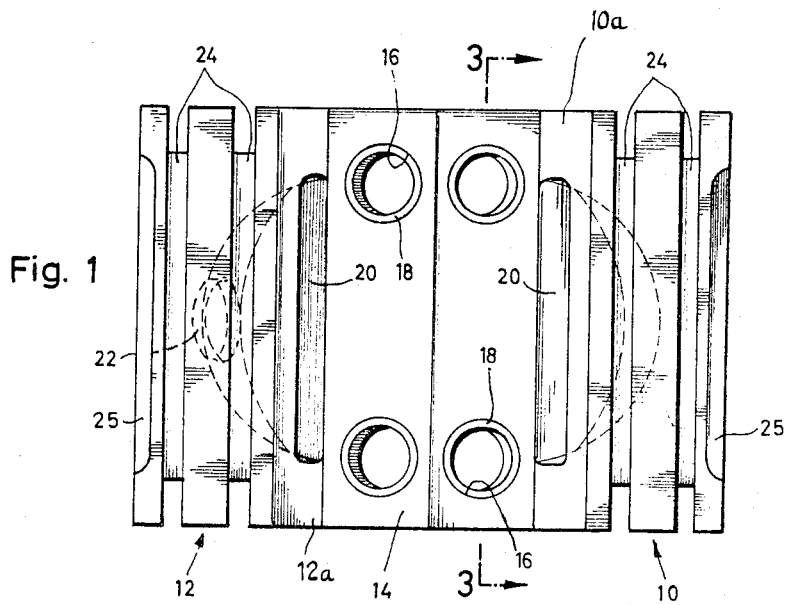
FIG. 1 is a top plan view of a piston which is constructed in accordance with my invention.
Figure 2:
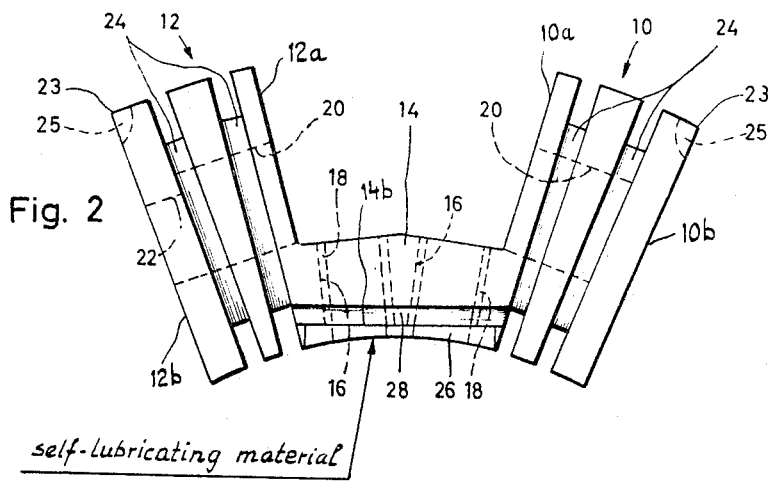
FIG. 2 is an end elevational view of the piston.

Referring to FIGS. 1 and 2, there is shown a U-shaped piston consisting of light metal and having an arcuate base or web 14 and two radially outwardly extending wings 10, 12 which are respectively integral with the leading and trailing ends of the web 14, it being assumed that the piston is to rotate in a clockwise direction, as viewed in FIG. 2. Thus, the wings 10, 12 are spaced from each other in the circumferential direction of the engine.

Figure 3:
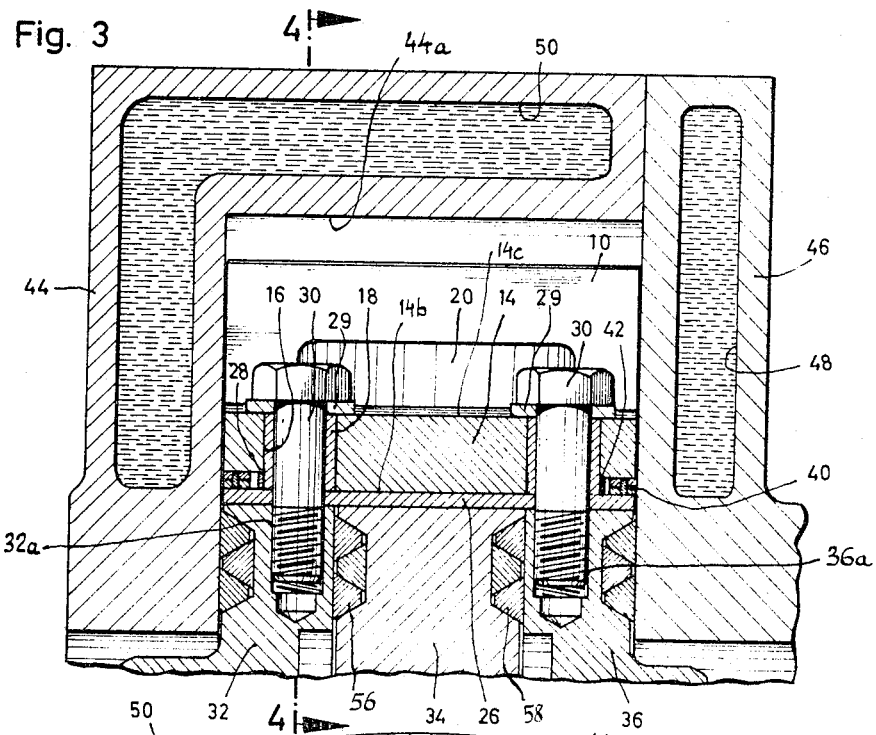
FIG. 3 is a fragmentary axial section through a rotary internal combustion engine which comprises two pairs of pistons of the type shown in FIGS. 1 and 2, only one such piston being actually shown in FIG. 3 and this piston being shown in a section as seen from the line 3—3 of FIG. 1.

The web 14 is provided with two pairs of radial through bores 16 each of which accommodates a cylindrical sleeve 18. The inner end faces 10a, 12a of the wings 10, 12 are provided with axial outwardly extending cutouts 20 of oval cross section which are adjacent to the web 14. When viewed from above (see FIG. 1), the cutouts 20 are of substantially semicircular outline. As best shown in FIG. 3, the left-hand cutout 20 communicates with a channel 22 which extends all the way to the outer end face 12b of the trailing wing 12. The channel 22 constitutes an optional feature of the piston.

Each wing is provided with two circumferentially complete grooves 24 whose planes are respectively parallel (or substantially parallel) to the planes of the inner end faces 10a, 12a. The grooves 24 serve to receive sealing elements which will be described in connection with FIGS. 3 and 4. In addition, the radially outermost portions of the outer end faces 10b, 12b on the wings 10, 12 are provided with axially extending shallow recesses 25 which terminate short of the axial ends of the respective wings and are spaced from the web 14.

The concave inner surface 14a of the web 14 is provided with an axially extending depression 14b which accommodates a bearing plate 26. The axial ends of the bearing plate 26 are inwardly adjacent to a pair of grooves 28 (best shown in FIGS. 2 and 3) which accommodate suitable sealing elements to prevent leakage along the axial ends of the web 14. In accordance with an important feature of my invention, the bearing plate 26 consists of a material whose heat expansion coefficient is only slightly different from, or corresponds to, that of the material of a hub 32–36 on which the piston is mounted. Also, the heat expansion coefficient of the sleeves 18 preferably corresponds to or approximates closely the heat expansion coefficient of the plate 26 and hub 32–36. The inner side of this plate 26 is coated with a layer of copper or another suitable self-lubricating material which reduces wear on the hub and/or on the bearing plate. The feature that the heat expansion coefficient of the sleeves 18 at least approximates the heat expansion coefficient of the hub brings about considerable reduction of stresses upon bolts 30 or similar threaded fasteners which are used to connect the piston with one or more sections of the hub.

Figure 4:
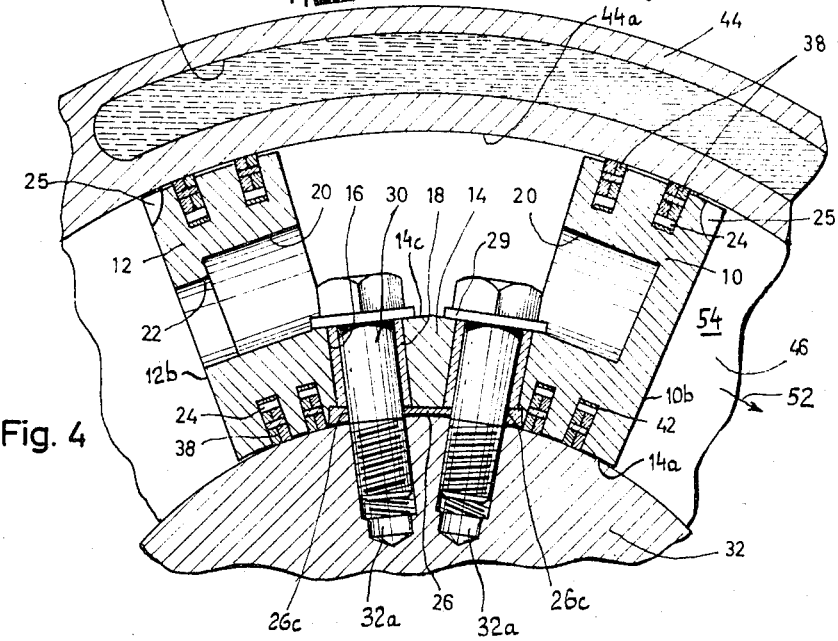
FIG. 4 is a section as seen in the direction of arrows from the line 4—4 of FIG. 3.

FIGS. 3 and 4 illustrate a portion of a fully assembled rotary internal combustion engine which comprises several pistons of the type shown in FIGS. 1 and 2, only one such piston being actually illustrated in FIGS. 3 and 4. The engine comprises a fixed composite cylinder including a cupped portion 44 and an annular cover 46. The piston is attached by means of four bolts 30 whose heads bear against washers 29 and whose threaded stems extend through the sleeves 18 and into tapped blind bores 32a, 36a provided in the outer sections or disks 32, 36 of a multi-section hub which further includes a median section or disk 34. The stems of the bolts 30 extend through registering apertures 26c provided in the bearing plate 26; and the inner side of this plate abuts against the peripheral surfaces of the disks 32, 34, 36. The disk 34 is angularly movable with reference to the disks 32, 36 so that the plate 26 slides with respect thereto when the engine is in operation.

The grooves 24 and 28 respectively accommodate sealing elements 38 and 40 which are biased by leaf springs 42 in order to bear against the internal surfaces of the cylinder portions 44 and 46. The portions 44, 46 are provided with coolant-containing compartments 50, 48. The sealing elements 38 may be of the type disclosed in my copending application Serial No. 370,947, filed May 28, 1964.

The piston shown in FIGS. 3 and 4 constitutes one of a first pair of pistons which are mounted on the outer disks 32, 36 substantially diametrically opposite each other. The engine comprises a second pair of pistons which are fixed to the median disk 34 so that their bearing plates 26 may slide with reference to the outer disks 32, 36. When the engine is in operation, a system of oval gears or the like causes the two pairs of pistons to change their angular positions with reference to each other whereby the volumes of the four cylinder chambers between the pistons increase or decrease to respectively draw a fuel-air mixture or to expel combustion products in a manner well known from the art of rotary internal combustion engines. A somewhat similar engine is disclosed in French Patent No. 467,924 and in my copending application Serial No. 169,779 filed January 30, 1962, now Patent No. 3,203,405.

When the engine of FIGS. 3 and 4 is in operation and the pistons rotate at a high speed (arrow 52), fuel admitted into a cylinder chamber tends to follow the centrifugal force and is pressed against the cylindrical internal surface 44a of the cupped cylinder portion 44. Such fuel has very little time to mix with air because the pistons rotate at high speed so that each cylinder chamber 54 receives comparatively small quantities of air during the mixing stage of an operating cycle. In order that the chambers 54 may receive more air, the outer end faces 10b, 12b of the piston are provided with the aforementioned recesses 25. Another very important advantage of the recesses 25 is that they allow for timely preignition of the fuel-air mixture; this will be readily understood by taking in consideration that the outer end face 10b of the leading wing 10 on a first piston is very closely adjacent to the outer end face 12b on the trailing wing 12 of the adjoining piston when the fuel-air mixture is ignited, either by a spark plug or in response to compression of diesel oil. In other words, at the time of ignition, the volume of a cylinder chamber 54 may be reduced to zero so that the fuel-air mixture enters two closely adjacent recesses 25 which, for this purpose, are immediately adjacent to the internal cylindrical surface 44a.

As stated above, the piston of my engine preferably consists of light metal, e.g., an alloy of aluminum whose heat expansion coefficient differentiates substantially from the heat expansion coefficient of the material of the hub 32–36. As a rule, the disks 32, 34, 36 are castings of steel or similar ferrous material. The pistons are made of lightweight material to reduce the effect of centrifugal force and to improve the heat conductivity of the pistons when the engine is in operation. Were the bearing plate 26 and the sleeves 18 integral with the piston, they would be likely to expand in strong frictional engagement with the median disk 34 to thereby increase the resistance to angular displacement of the disk 34 with reference to the outer disks 32, 36 or vice versa. This is highly undesirable in rotary internal combustion engines. Also, and were a piston connected directly to the outer disks 32, 36, it would tend to move such disks axially and away from the median disk 34 which could result in leakage along the seals 56, 58 and/or in excessive frictional engagement between the outer axial end faces of the disks 32, 36 and the adjoining internal surfaces of the cylinder portions 44, 46.

The channel 22 is provided in such types of engines wherein the ignition of a fuel-air mixture takes place at one side of a piston, i.e., at the outer end face 10b of the wing 10 shown in FIGS. 3 and 4. The channel 22 then contributes to a reduction in compression losses.

It is clear that the piston of my invention may be modified by inserting the bearing plate 26 in suitable depressions provided in the peripheral surfaces of the outer disks 32, 36. Of course, the bearing plates 26 for the other pair of pistons which are slidable with reference to the outer disks 32, 36 are then inserted into depressions provided in the peripheral surface of the median disk.

Figure 5:
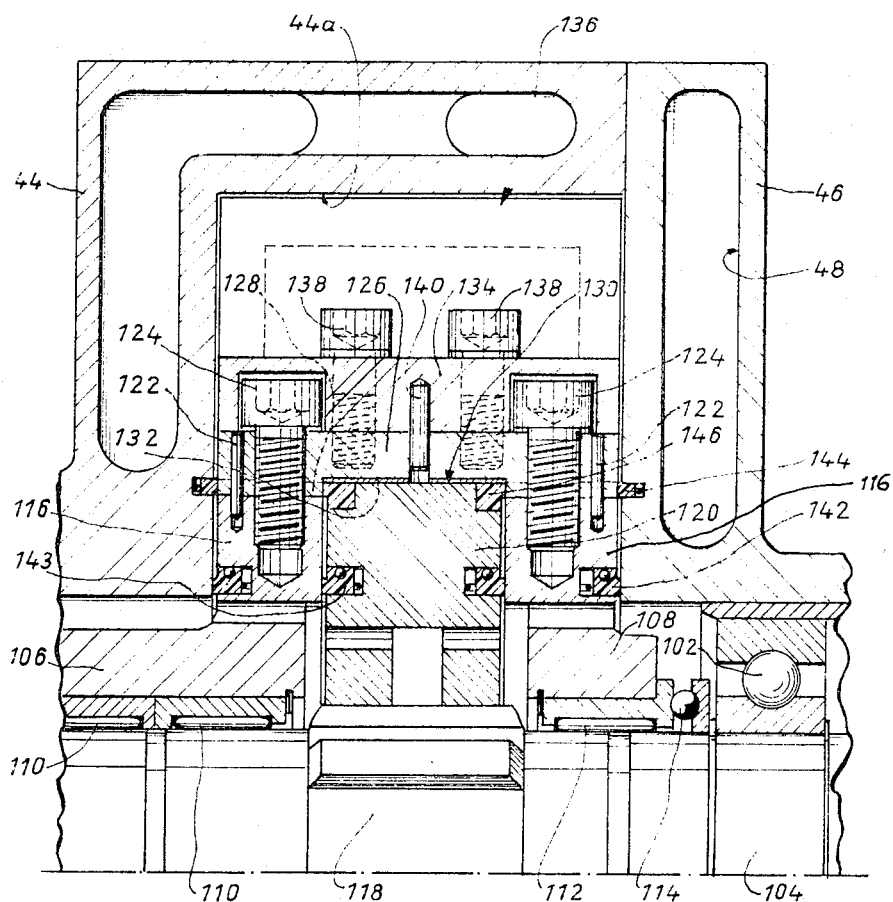
FIG. 5 is a fragmentary axial section through a modified engine.

This modification is shown in FIG. 5. A main shaft 104 carries an antifriction bearing 102 for the cover 46 of the cylinder which latter also includes a cupped portion 44. The main shaft 104 is surrounded by two hollow coaxial shafts 106, 108 which are respectively mounted on needle bearings 110, 112. A thrust bearing 114 is disposed between the bearings 104 and 112.

The hollow shafts 106, 108 comprises hub sections in the form of flanges 116 and the main shaft 104 comprises a hub section or flange 118 which is secured to a disk-shaped annular hub section 120. The two outer flanges 116 and the annular hub section 120 respectively correspond to the disks 32, 36 and 34 shown in FIG. 3.

A bearing plate 126 is secured to the flanges 116 by slide pins 122 and threaded bolts 124. The bearing plate 126 is recessed into the peripheral surfaces 128 of the flanges 116 and its inner face is turned toward the peripheral surface 130 of the median hub section 120.

This inner face of the bearing plate 126 is coated with a layer 132 of self-lubricating material, for example, a layer of copper which reduces friction when the plate 126 moves with reference to the main shaft 104.

The bolts 124 have heads which are accommodated in recesses provided in the web 134 of a modified piston 136. The connection between the piston 136 and bearing plate 126 comprises threaded bolts 138 and slide pins 140. The end faces of the flanges 116 are provided with grooves which accommodate suitable seals 142 bearing against the cylinder portions 44, 46 to prevent leakage of fuel, air or combustion products in directions toward the periphery of the main shaft 104. The cylinder portions 44, 46 are also provided with grooves which accommodate seals 144 bearing against the plate 126. Two pairs of seals 143, 146 are recessed into the end faces of the median hub section 120 in such positions that the seals 143 bear against the adjacent end faces of the flanges 116 and the seals 146 bear against the plate 126.

It is clear that the engine of FIG. 5 also comprises a second piston 136 which is located substantially diametrically opposite the piston 136 shown in FIG. 5, and a second pair of pistons which are connected to the median hub section 120. The second piston 136 is connected to the flanges 116.

In accordance with a further feature of the present invention, the axial length of the bolts 30 is less than the distance between the outer side 14c of the web 14 and the internal surface 44a of the cupped cylinder portion 44. This enables the operator to remove a piston from the interior of the cupped portion 44 while the position of the hub 32–36 remains unchanged. Thus, the operator merely detaches the cover 46 and rotates the bolts 30 by means of a suitable tool so that the bolts are withdrawn from the tapped bores 32a, 36a. The piston is then ready to be withdrawn in the axial direction of the portion 44.

In accordance with a further feature of my invention which has been described in connection with FIG. 5, the fasteners which connect a piston with the hub section 120 or with the hub sections 116 include two sets of fasteners. One set of fasteners includes threaded bolts or screws 138 which serve to connect the piston with the bearing plate 126, and the other set of fasteners includes slide pins 122 or the like serving to couple the bearing plate 126 to the corresponding section or sections of the hub. Alternatively or in addition to the just mentioned connection, the bearing plate 126 may be bolted to the hub by bolt 124 and the slide pins 140 serve to couple the bearing plate 126 with the piston 136. Such construction insures that the piston may expand independently of the hub and/or the bearing plate and is preferably utilized in engines operating with a high compression ratio wherein leakage, friction and wear should be kept as low as possible.

The plate 26 and sleeves 18 can be made of the same material as the disks 32, 34 and 36; for example they can be manufactured of high-quality steel or tool steel, such as 20 Mn Cr 5. The bearing plate 126 may be made of similar ferrous material.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a rotary internal combustion engine, in combination, a rotary metallic hub having a peripheral surface and comprising a pair of coaxial sections movable angularly with reference to each other; a piston extending radially outwardly from said hub and having a surface adjacent to said peripheral surface, said piston consisting of metallic material whose heat expansion coefficient differentiates substantially from the heat expansion coefficient of the material of said hub; a plate-like bearing member interposed between said surfaces and consisting of a material whose heat expansion coefficient at least approximates the heat expansion coefficient of the material of said hub; and fastener means securing said piston and said bearing member to one section of said hub.

2. In a rotary internal combustion engine, in combination, a rotary metallic hub having a peripheral surface and comprising a pair of coaxial sections movable angularly with reference to each other; a piston extending radially outwardly from said hub and having a surface adjacent to said peripheral surface, said piston further having a plurality of radial through bores and consisting of metallic material whose heat expansion coefficient differentiates substantially from the heat expansion coefficient of the material of said hub; a plate-like bearing member interposed between said surfaces and consisting of a material whose heat expansion coefficient at least approximates the heat expansion coefficient of the material of said hub, said bearing member having apertures in registry with said through bores; sleeves provided in said bores and consisting of a material whose heat expansion coefficient at least approximates the heat expansion coefficient of the material of said hub; and threaded fasteners extending through said through bores and apertures and meshing with one section of said hub to connect said one section with said piston.

3. In a rotary internal combustion engine, in combination, a rotary metallic hub comprising a plurality of coaxial sections angularly movable with reference to each other and having cylindrical peripheral surfaces; a piston extending radially from said hub and having a concave surface adjacent to said peripheral surfaces, said concave surface having a depression overlying the peripheral surfaces of said sections; a plate-like bearing member provided in said depression and consisting of a material whose heat expansion coefficient at least approximates the heat expansion coefficient of the material of said hub sections; and fastener means securing said piston and said bearing member to one of said hub sections.

4. In a rotary internal combustion engine, in combination, a rotary hub comprising a section having a cylindrical peripheral surface; a piston having a concave surface adjacent to a portion of said peripheral surface, one of said surfaces having a depression extending in the axial direction of said hub; a plate-like bearing member provided in said depression and extending axially beyond said section, said bearing member consisting of a material whose heat expansion coefficient at least approximates the heat expansion coefficient of the material of said hub section; and fasteners securing said piston and said bearing member to said hub section.

5. A structure as set forth in claim 4, wherein said fasteners comprise a first set of fasteners securing said piston to said bearing member and a second set of fasteners securing said bearing member to said hub section.

6. In a rotary internal combustion engine, in combination, a rotary hub comprising a plurality of coaxial sections movable angularly with reference to each other and having cylindrical peripheral surfaces; a U-shaped piston comprising a web and a pair of radially outwardly extending wings integral with said web, said wings being spaced from each other in the circumferential direction of said hub, said web having a concave surface adjacent to portions of said peripheral surfaces and a plurality of radially extending through bores located intermediate said wings and registering with tapped bores provided in one of said hub sections; a plate-like bearing member disposed intermediate the concave surface of said web and the peripheral surfaces of said hub sections, said bearing member consisting of a material whose heat expansion coefficient at least approximates the heat expansion coefficient of the material of said hub sections and said bearing member having apertures registering with said through bores; and threaded fasteners extending through said apertures and said through bores and into said tapped bores to secure said piston and said bearing member to said one hub section.

7. In a rotary internal combustion engine, in combination, a rotary hub comprising a plurality of coaxial sections movable angularly with reference to each other and having cylindrical peripheral surfaces; a U-shaped piston comprising a web and a pair of radially outwardly extending wings integral with said web, said wings being spaced from each other in the circumferential direction of said hub, said web having a concave surface adjacent to portions of said peripheral surfaces and a plurality of radially extending through bores located intermediate said wings; a plate-like bearing member disposed intermediate the concave surface of said web and the peripheral surfaces of said hub sections, said bearing member consisting of a material whose heat expansion coefficient of the material of said hub sections and said bearing member having apertures registering with said through bores; cylindrical sleeves provided in said through bores and consisting of a material whose heat expansion coefficient at least approximates the heat expansion coefficient of the material of said hub sections; and fasteners extending through said apertures and said sleeves and into one of said hub sections to connect said bearing member to said piston and to said one section.

8. A structure as set forth in claim 7, wherein said concave surface has a depression receiving said bearing member and said bearing member comprises a layer of self-lubricating material engaging the peripheral surfaces of said hub sections.

9. A structure as set forth in claim 7, further comprising a composite cylinder coaxially surrounding said hub and having a cylindrical internal surface adjacent to said wings, the distance between the internal surface of said cylinder and said web being less than the axial length of said fasteners.

10. A structure as set forth in claim 7, wherein said wings have outer end faces provided with axially extending recesses distant from said web.

11. A structure as set forth in claim 7, wherein said wings have inner end faces provided with axially extending cutouts adjacent to said web.

12. A structure as set forth in claim 11, wherein said wings have outer end faces and one of said wings is provided with a channel communicating with the respective cutout and extending to the outer end face of said one wing.

13. A structure as set forth in claim 7, further comprising a cylinder coaxially surrounding said hub and sealing elements interposed between said hub sections, between said cylinder and said hub sections, between said piston and said cylinder, and between said piston and said hub.

14. A rotary internal combustion engine, comprising in combination, a rotary metallic hub having a peripheral surface and comprising a pair of coaxial sections movable angularly with reference to each other; a piston extending radially outwardly from said hub and having a surface adjacent to said peripheral surface, said piston consisting of metallic material whose heat expansion coefficient differentiates substantially from the heat expansion coefficient of the material of said hub; a bearing member interposed between said surfaces and consisting of a material whose heat expansion coefficient at least approximates the heat expansion coefficient of the material of said hub; and fastener means securing said piston and said bearing member to one section of said hub.

15. A rotary internal combustion engine according to claim 14, wherein said hub consists of ferrous material and said piston consists of lightweight metal.

References Cited by the Examiner

UNITED STATES PATENTS

| | | | |
|---|---|---|---|
| 352,089 | 11/1886 | Hopper | 91—60 |
| 3,044,687 | 7/1962 | Davey | 103—216 X |
| 3,111,261 | 11/1963 | Bentele et al. | 123—8 X |

MARK NEWMAN, *Primary Examiner.*

F. T. SADLER, *Assistant Examiner.*